(12) United States Patent
Jiang et al.

(10) Patent No.: US 8,686,606 B2
(45) Date of Patent: Apr. 1, 2014

(54) COOLING DEVICE

(75) Inventors: Mao Xiong Jiang, Shenzhen (CN); Yue Li, Hong Kong (CN); Gang Li, Shenzhen (CN); Yong Wang, Shenzhen (CN); Hai Hui Xiang, Shenzhen (CN)

(73) Assignee: Johnson Electric S.A., Murten (CH)

( * ) Notice: Subject to any disclaimer, the term of this patent is extended or adjusted under 35 U.S.C. 154(b) by 90 days.

(21) Appl. No.: 13/404,877

(22) Filed: Feb. 24, 2012

(65) Prior Publication Data

US 2012/0217826 A1 Aug. 30, 2012

(30) Foreign Application Priority Data

Feb. 25, 2011 (CN) .......................... 2011 1 0046434

(51) Int. Cl.
*H02K 9/00* (2006.01)

(52) U.S. Cl.
USPC .............................................. 310/54; 310/59

(58) Field of Classification Search
USPC ........................ 310/54, 52, 58, 59, 60 A, 64
See application file for complete search history.

(56) References Cited

U.S. PATENT DOCUMENTS

| 2,862,120 | A | * | 11/1958 | Onsrud | 310/54 |
|---|---|---|---|---|---|
| 5,808,391 | A | * | 9/1998 | Avakian et al. | 310/211 |
| 7,675,209 | B2 | | 3/2010 | Masoudipour et al. | |
| 8,161,643 | B2 | * | 4/2012 | Smith et al. | 29/890.03 |
| 2008/0030085 | A1 | * | 2/2008 | Gizaw et al. | 310/54 |

FOREIGN PATENT DOCUMENTS

| DE | 19624519 | 1/1998 |
|---|---|---|
| JP | 1136540 | 5/1989 |
| WO | WO2010/100143 | 9/2010 |

* cited by examiner

*Primary Examiner* — Nguyen N Hanh
(74) *Attorney, Agent, or Firm* — Muncy, Geissler, Olds & Lowe, P.C.

(57) ABSTRACT

A cooling device includes an inner sleeve with an outer surface, an outer sleeve surrounding the inner sleeve, and two end portions extending between the inner sleeve and the outer sleeve at the ends. The inner sleeve, the outer sleeve and the end portions define a peripheral space. A flow guiding structure defines N channels in the peripheral space for coolant to flow, where N is an integer equal to or greater than 1. Each channel has at least two branches, and N pairs of inlet and outlet corresponding to the N channels. The branches of each channel are in fluid communication with a respective pair of inlet and outlet. Each branch extends over a half circumferential part of the outer surface of the inner sleeve. An electric motor incorporating the cooling device is also provided.

13 Claims, 6 Drawing Sheets

COOLING DEVICE

CROSS REFERENCE TO RELATED APPLICATIONS

This non-provisional patent application claims priority under 35 U.S.C. §119(a) from Patent Application No. 201110046434.1 filed in The People's Republic of China on Feb. 25, 2011.

FIELD OF THE INVENTION

This invention relates to a cooling device and in particular, to a cooling device especially suitable for cooling an electric motor. In a simple form of the invention, one embodiment forms a water jacket for a small size or miniature PMDC motor.

BACKGROUND OF THE INVENTION

Electric motors usually generate heat during operation. In some applications, the motors are required to be cooled to avoid damage caused by overheating so as to ensure normal operation.

U.S. Pat. No. 7,675,209 discloses a cooling device of a dry-liquid cooled electric motor. The cooling device surrounds the iron stack and winding of the stator of the motor. Cooling liquid is circulated through channels within the cooling device and heat is transferred from the stator through direct contact of the stator with the cooling device. The cooling device has an inner sleeve and an outer sleeve. The outer sleeve surrounds the inner sleeve forming a circular space between the outer sleeve and the inner sleeve. A continuous winding path is arranged within the circular space and extends axially back and forth along the circumference of the inner sleeve. The inner sleeve includes an end section with a bearing housing and two openings functioning as an inlet and an outlet. The inlet and the outlet are positioned diagonally across from each other at one axial end of the cooling device. As the temperature of the cooling liquid gradually increases after the cooling liquid enters into the winding path, the temperature of the cooling liquid near the inlet is lower than the temperature of the cooling liquid near the outlet, and thus the stator can not be evenly cooled in the circumferential direction. Besides, the end section with the bearing housing increases the axial length of the motor.

Hence there is a desire for a cooling device for an electric motor which provides even cooling of the stator core.

SUMMARY OF THE INVENTION

According to one aspect, the present invention provides a cooling device comprising: an inner sleeve with an outer surface, defining circumferential and longitudinal directions; an outer sleeve surrounding the inner sleeve; two end portions extending between the inner sleeve and the outer sleeve at both ends thereof, the inner sleeve, the outer sleeve and the end portions defining a peripheral space; a flow guiding structure which defines N cooling channels in the peripheral space allowing coolant to flow, each channel having at least two branches; and N pairs of inlet and outlet corresponding to the N cooling channels, the branches of each cooling channel being in fluid communication with the respective pair of inlet and outlet, each branch extending over a half circumferential part of the outer surface of the inner sleeve, where N is an integer equal to or greater than 1.

Preferably, each cooling channel has a pair of branches which are in communication with each other only at the respective pair of inlet and outlet.

Preferably, N equals to 1, and the inlet and the outlet are respectively arranged adjacent to and between the two end portions.

Preferably, N is equal to 1, and each branch travels circumferentially back and forth along the longitudinal direction.

Preferably, N is greater than 1 and the N cooling channels are not in communication with each other.

Preferably, each branch of the cooling channels extends longitudinally along a path which goes back and forth in the circumferential direction.

Preferably, the branches of the N cooling channels are alternately arranged in the circumferential direction.

Preferably, each inlet is spaced from the respective outlet by 180 degrees in the circumferential direction.

Preferably, the inlet of each pair is close to the outlet of another pair.

According to a second aspect, the present invention provides a cooling device comprising: an inner sleeve with an outer surface, defining circumferential and longitudinal directions; an outer sleeve surrounding the inner sleeve; two end portions arranged at both ends thereof, the inner sleeve, the outer sleeve and the end portions defining a peripheral space; a flow guiding structure which defines N winding cooling channels in the peripheral space allowing coolant to flow; and N inlets and a single outlet, the coolant entering into the N winding cooling channels respectively from the N inlets and flowing out from the single outlet, where N is an integer greater than 1.

Preferably, the cooling device further comprises a circumferentially extended outflow channel connecting the N winding cooling channels and the single outlet.

Preferably, each of the N winding cooling channels extend longitudinally along a path which goes back and forth in the circumferential direction.

Preferably, the N inlets are spaced in turn by 360/N degrees in the circumferential direction.

Preferably, N is equal to or greater than 3, every two cooling channels are alternately arranged in the circumferential direction, and each cooling channel extends over a respective circumferential part of the outer surface of the inner sleeve within a range of 720/N degrees.

According to a third aspect the present invention also provides an electric motor comprising a stator, a rotor installed in the stator, and a cooling device as described above, wherein the cooling, device is fixed to an outer surface of the stator.

Preferably, the cooling device is a press fit on a core of the stator.

According to the embodiments of the present, the stator can be evenly cooled in the circumferential direction and the pressure loss is low.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
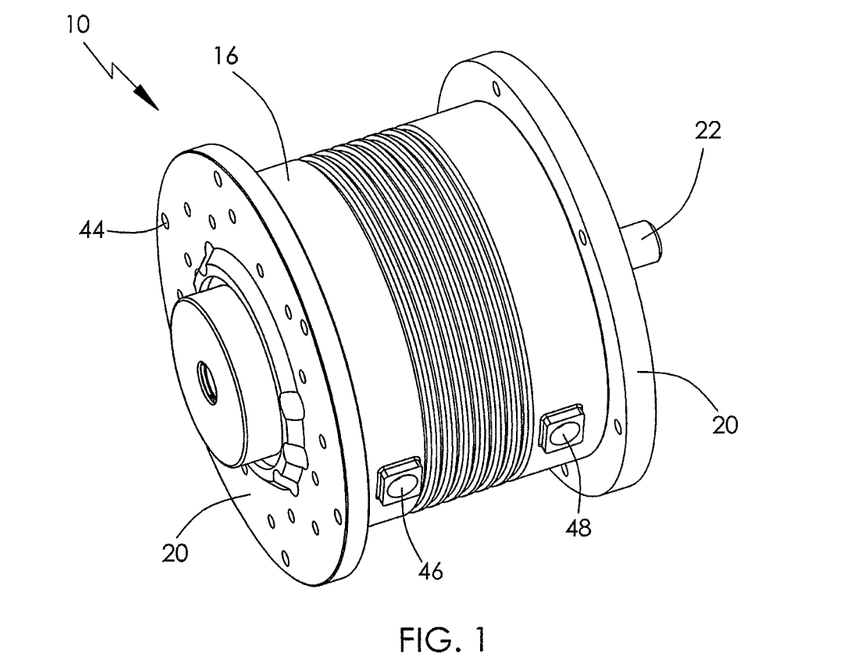
FIG. 1 is a view of an electric motor incorporating a cooling device in accordance with an preferred embodiment of the present invention.
Figure 2:
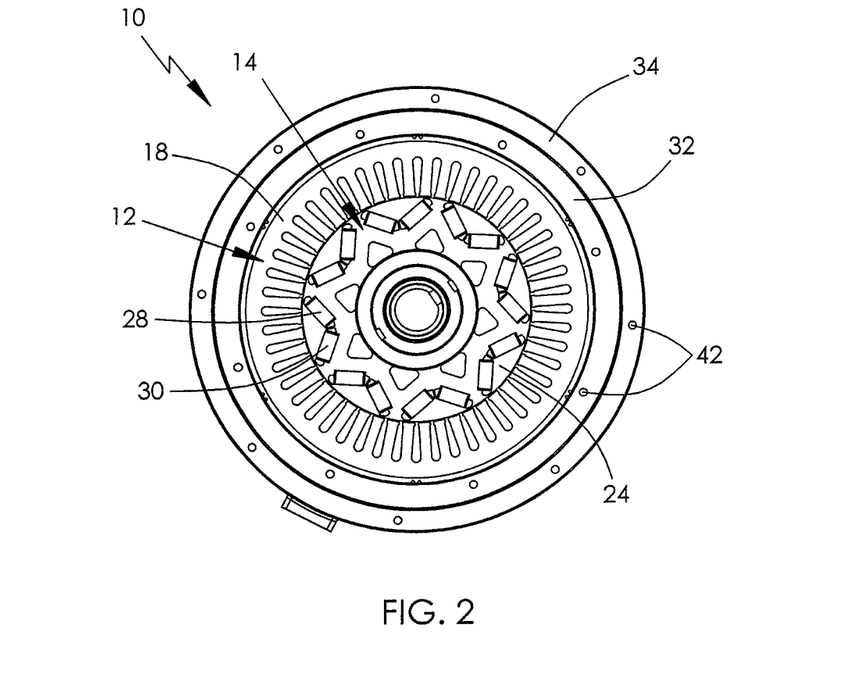
FIG. 2 is an axial end view of the motor of FIG. 1, with end caps, stator windings and retaining disks removed.
Figure 3:
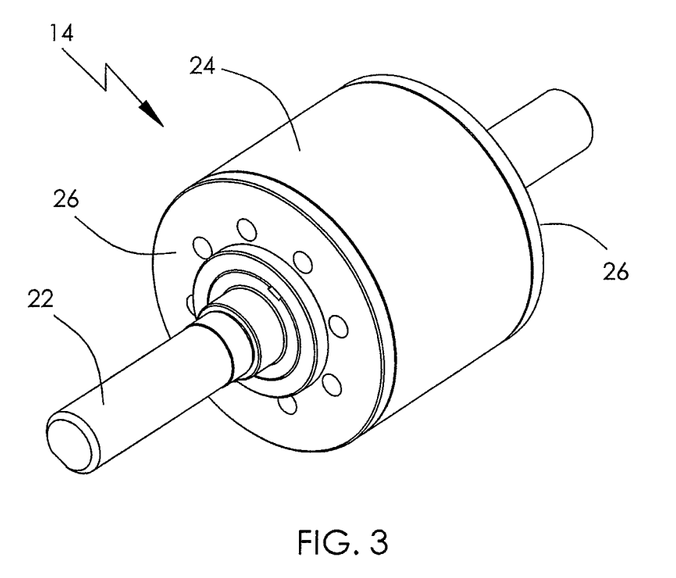
FIG. 3 is a view of a rotor being a part of the motor of FIG. 1.

FIGS. 1 to 3 illustrate an electric motor 10 incorporating a cooling device in accordance with a preferred embodiment of the present invention. The motor 10 includes a stator 12, a rotor 14 installed in the stator 12, and a cooling device 16 for cooling the motor. The stator 14 has a stator core 18 having a circular yoke and a plurality of salient poles radially and inwardly extending from an inner surface of the yoke. Stator windings (not shown in the figures) are wound about the salient poles. The cooling device 16 extends circumferentially about the stator core 18 and longitudinally in a direction parallel to the axis of the motor. Two end caps 20 are mounted to respective longitudinal ends of the cooling device 16. Each end cap 20 has a bearing mounted therein.

The rotor 14 comprises a shaft 22, a rotor core 24 fixed onto the shaft 22, permanent magnets mounted to the rotor core 24 and two retaining disks 26 mounted to respective axial ends of the rotor core 24. The rotor core 24 and the magnets are held between the two retaining disks 26. The shaft 22 is rotatably supported by the bearings in the end caps 20 with the rotor core 24 confronting the stator core 18. An air gap is formed between the rotor core 24 and the stator core 18. In this embodiment, the rotor 14 has a plurality of magnetic poles, each of which is formed by two magnets 28 and 30 fitted in slots formed in the rotor core. For each magnetic pole, the cross section of the two magnets 28 and 30 makes a V shape having an outward facing opening and bisected by a radial line.

Figure 4:
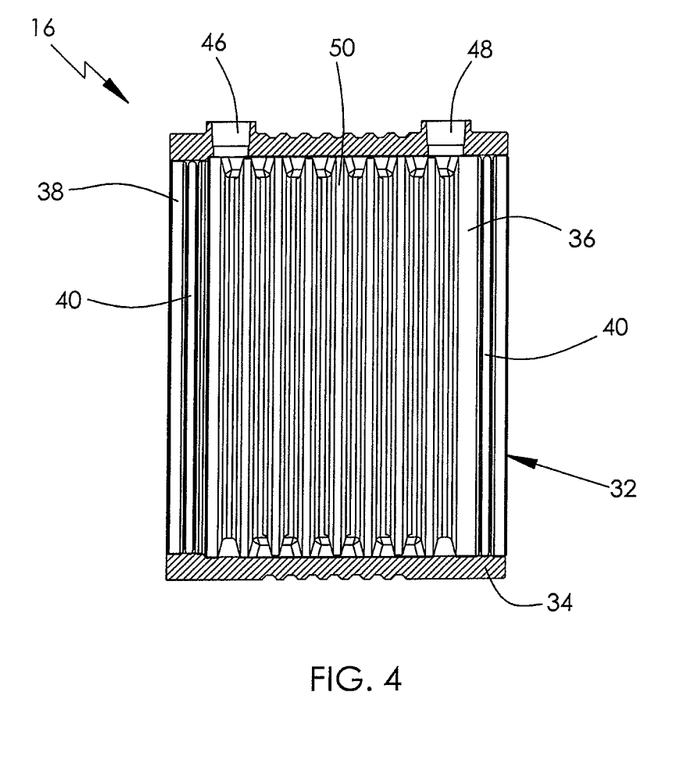
FIG. 4 is a cut away view of the cooling device.
Figure 5:
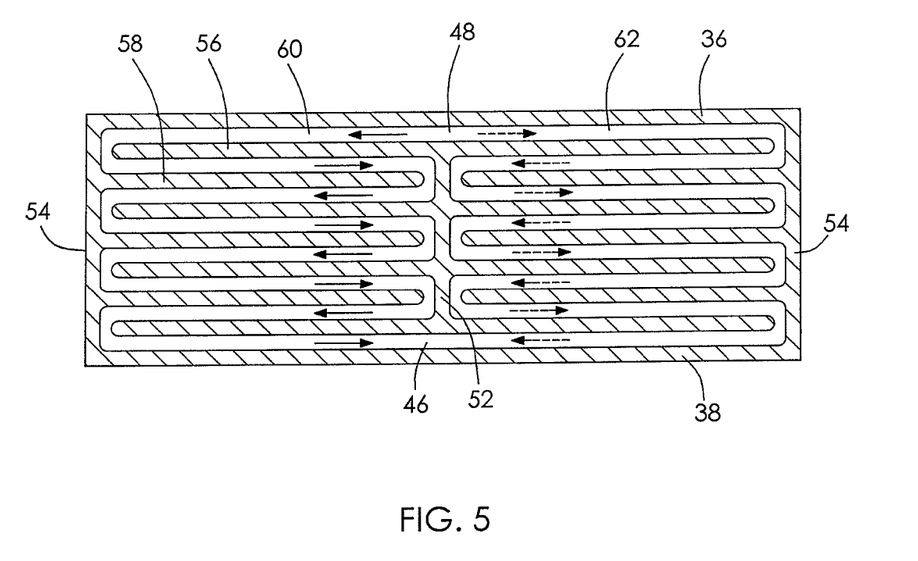
FIG. 5 is a laid-out view of an inner sleeve of the cooling device of FIG. 4.

Also referring to FIGS. 4 and 5, the cooling device 16 is preferably made of aluminum alloy and comprises an inner sleeve 32, an outer sleeve 34 surrounding and aligned with the inner sleeve 32, and two circular end portions 36 and 38 extending between the inner sleeve 32 and the outer sleeve 34 and arranged at respective axial ends thereof. The end portions 36 and 38 may integrally extend from the inner sleeve 32. It should be understood, as an alternative, that the end portions may integrally extend from the outer sleeve 34. The inner surface of the inner sleeve 32 is mounted onto an outer surface of the stator core 18 by an interference fit. The inner sleeve 32 and the outer sleeve 34 have a cylindrical shape and extend coaxially with the axis of the shaft. Two O-rings 40 are arranged between the inner sleeve 32 and the outer sleeve 34 at respective axial ends of the cooling device to prevent the coolant from leaking from the gap between the two sleeves. Mounting holes 42 are formed at axial end surfaces of the inner sleeve 32 and the outer sleeve 34 and corresponding through holes 44 are formed on the two end caps 20 so that the end caps 20 can be mounted to the cooling device using screws (not shown).

The outer sleeve 34 has a pair of openings functioning as an inlet 46 and an outlet 48. The inlet 46 and the outlet 48 are respectively arranged between and adjacent to the two end portions 36 and 38 and aligned with each other in the axial direction. Between the outer sleeve 34, the inner sleeve 32 and the two end portions 36 and 38 a peripheral space 50 is defined.

A flow guiding structure is formed within the peripheral space 50. The flow guiding structure includes a plurality of guiding plates extending in the circumferential direction and two partitions 52 and 54 extending in the axial direction. The guiding plates and the partitions vertically extend between the inner sleeve 32 and the outer sleeve 34. The guiding plates are uniformly disposed between the two end portions 36 and 38. The partition 52 extends axially between the two openings 46 and 48. The other partition 54 connects the two end portions 36 and 38 and is spaced from the partition 52 by 180 degrees in the circumferential direction. The plurality of guiding plates are divided into two groups respectively arranged on two semicircular parts of the outer surface of the inner sleeve 32 defined by the two partitions 52 and 54. Each group of guiding plates includes first plates 56 and second plates 58 which are alternately arranged in the axial direction and extend oppositely from the two partitions 52 and 54. The circumferential length of each first and second plate 56 and 58 is less than the circumferential distance between the two partitions 52 and 54. Thus, the two groups of guiding plates and the two partitions define a cooling channel with two continuous winding branches 60 and 62 (as shown by arrows in solid and dashed lines respectively in the laid-out view of FIG. 5) which are in fluid communication with each other only at the two openings 46 and 48. Each branch 60, 62 travels circumferentially back and forth on a respective semicircular part of the outer surface of the inner sleeve 32 while progressing in the axial direction.

Figure 6:
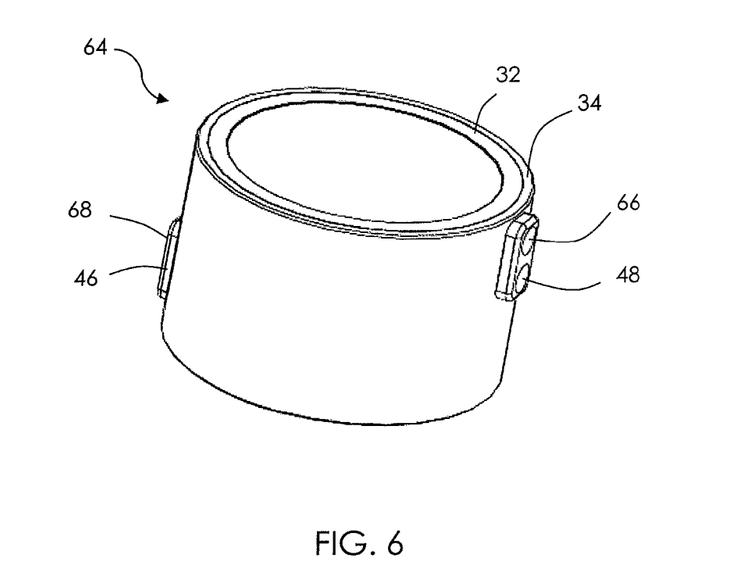
FIG. 6 is a view of a cooling device in accordance with another embodiment of the present invention.
Figure 7:
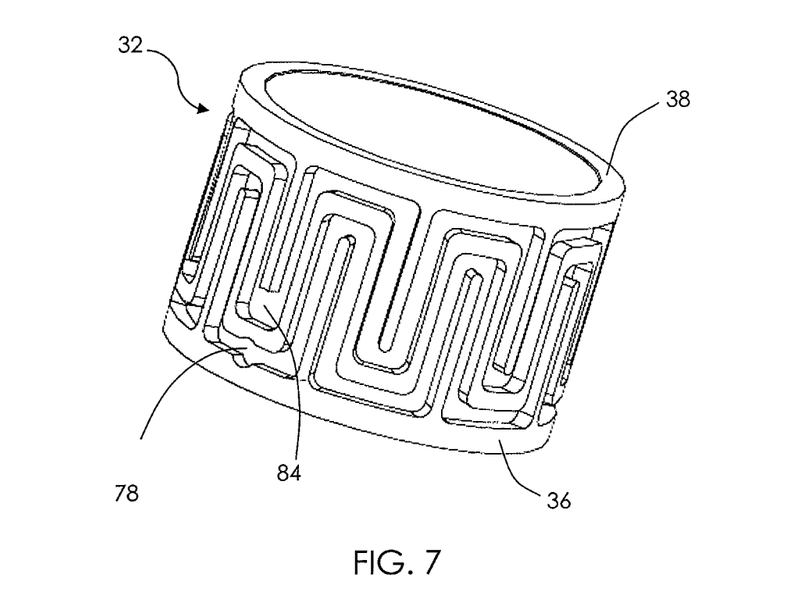
FIG. 7 illustrates an inner sleeve being a part of the cooling device of FIG. 6.
Figure 8:
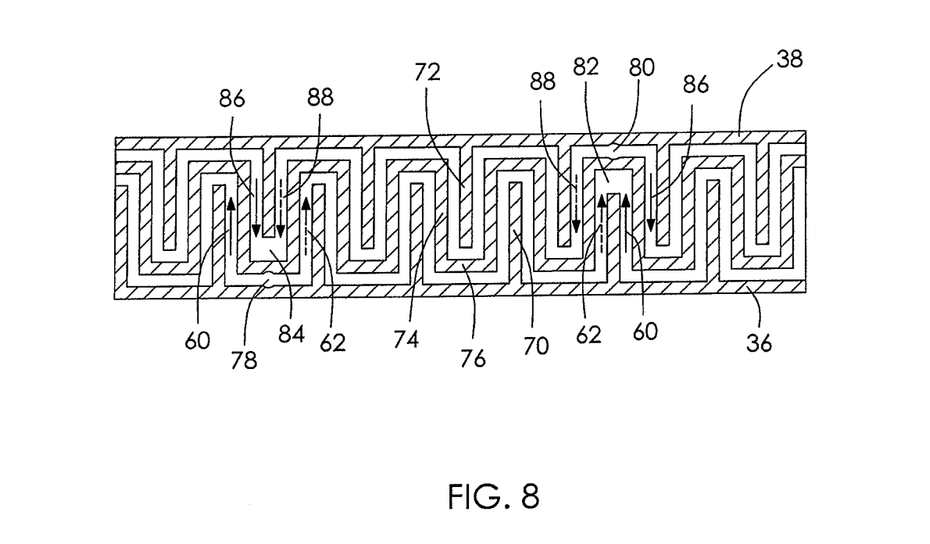
FIG. 8 is a laid-out view of the inner sleeve of FIG. 7.

FIGS. 6 to 8 illustrate a cooling device 64 in accordance with another embodiment of the present invention. The outer sleeve 34 of the cooling device 64 has two pairs of openings 46, 48 and 66, 68, each pair having an inlet 46, 66 and an outlet 48, 68. The inlet of each pair is spaced from the respective outlet by 180 degrees in the circumferential direction and adjacent to and aligned with the outlet of the other pair in the axial direction.

A flow guiding structure is formed within the peripheral space 50 defined by the outer sleeve 34, the inner sleeve 32, and the two end portions 36 and 38. The flow guiding structure includes a plurality of guiding plates axially extending between the inner sleeve 32 and the outer sleeve 34. The plurality of guiding plates are divided into two groups which are respectively arranged on two semicircular parts of the outer surface of the inner sleeve 32 defined by the two pairs of openings. Each group of guiding plates has first plates to fourth plates 70, 72, 74 and 76. The first plates 70 and the second plates 72 are alternately arranged in the circumferential direction and extend oppositely from the two end portions 36 and 38. The axial length of each first and second plate is less than the axial distance between the two end portions. Between each two adjacent first and second plates an axially extended third plate 74 is arranged. Each third plate 74 is spaced from the two end portions 36 and 38 and axially extends beyond free ends of the adjacent first and second plates at two ends. Each two adjacent third plates 74 are connected by a fourth plate 76 extending in the circumferential direction. The first inlet 46 is axially and radially aligned with a first channel inlet 78 defined between the end portion 36 and a fourth plates 76 adjacent to the end portion 36. The second inlet 66 is spaced from the first inlet 46 by 180 degrees in the circumferential direction and axially and radially aligned with a second channel inlet 80 defined between the end portion 38 and a fourth plates 76 adjacent to the end portion 38. The first outlet 48 is axially and radially aligned with a first channel outlet 82 defined between said fourth plate 76 adjacent to the end portion 38, two adjacent third plates 74 connected by the fourth plate, and a second plate 72 between the two adjacent third plates. The second outlet 68 is axially and radially aligned with a second channel outlet 84 defined between said fourth plate 76 adjacent to the end portion 36, two adjacent third plates 74 connected by the fourth plate, and a first plate 70 between the two adjacent third plates.

Thus, the two groups of guiding plates define two cooling channels. The first cooling channel has two continuous winding branches 60 and 62 which are in fluid communication with each other only at the channel inlet 78 and the channel outlet 82 and respectively travel on two semicircular parts of the outer surface of the inner sleeve 32 defined by the channel inlet 78 and the channel outlet 82. The second cooling channel has two continuous winding branches 86 and 88 which are in fluid communication with each other only at the channel inlet 80 and the channel outlet 84 and respectively travel in two semicircular parts of the outer surface of the inner sleeve 32 defined by the channel inlet 80 and the channel outlet 84. Each branch 60, 62, 86, 88 travels longitudinally back and forth while progressing in the circumferential direction.

Figure 9:
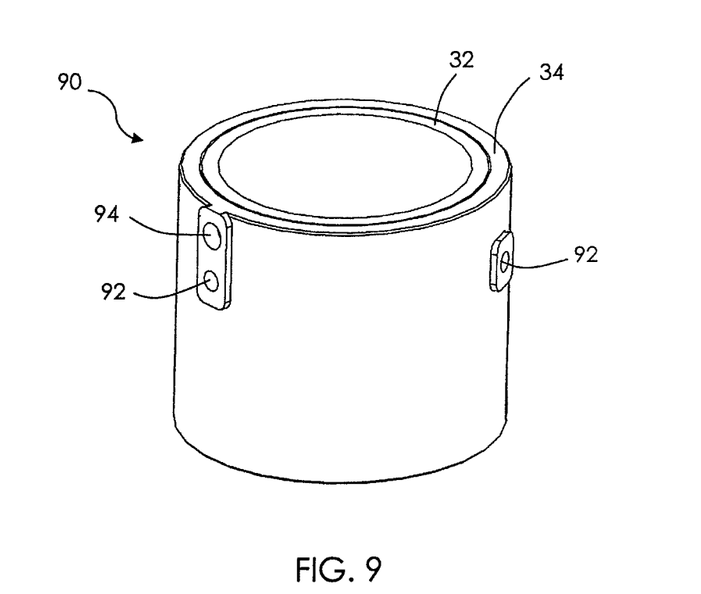
FIG. 9 is a view of a cooling device in accordance with a third embodiment of the present invention.
Figure 10:
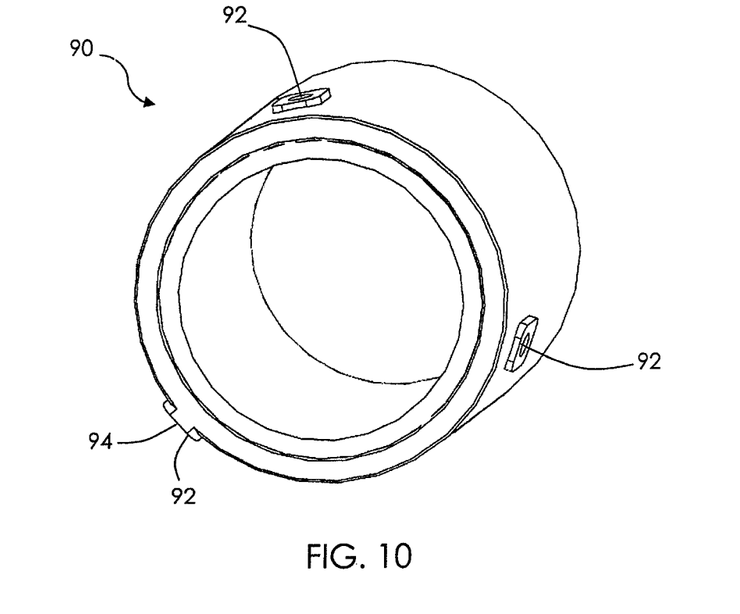
FIG. 10 is a view from above of the cooling device of FIG. 9.
Figure 11:
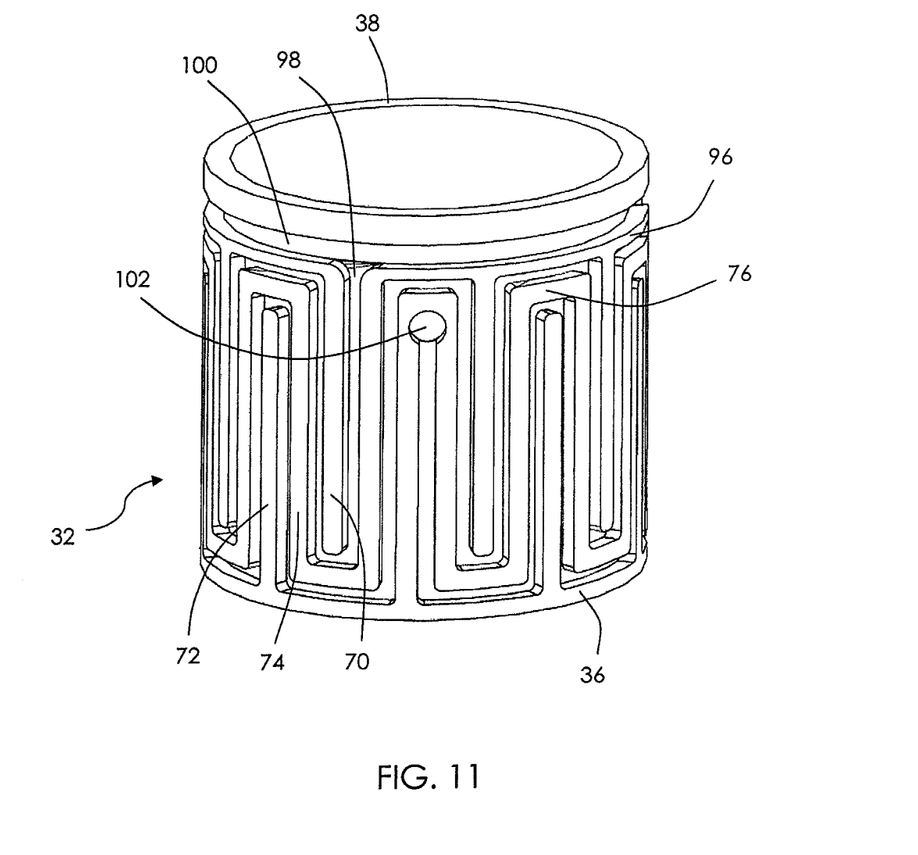
FIG. 11 is a view of an inner sleeve being a part of the cooling device of FIG. 9.

FIGS. 9 to 11 illustrate a cooling device 90 in accordance with a third embodiment of the present invention. The outer sleeve 34 of the cooling device 90 has three inlets 92 spaced in turn by 120 degrees in the circumferential direction and a single outlet 94 adjacent to and aligned with one of the inlets in the axial direction.

A flow guiding structure is formed within the peripheral space defined by the outer sleeve 34, the inner sleeve 32, and the two end portions 36 and 38. The flowing guiding structure has a circular plate 96 with three channel outlets 98 and a plurality of guiding plates. The circular plate 96 and the guiding plates vertically extend between the inner sleeve 32 and the outer sleeve 34. The circular plate 96 is adjacent to the end portion 38. Between the circular plate 96 and the end portion 38 a circular gap 100 is defined as an outflow channel. The outlet 94 on the outer sleeve 34 is axially aligned with the outflow channel 100. The guiding plates are arranged between the circular plate 96 and the end portion 36 and has first to fourth plates 70, 72, 74, 76. The first plates 70 and the second plates 72 are alternately arranged in the circumferential direction and extend oppositely from the circular plate 96 and the end portion 36. The axial length of each first and second plate is less than the axial distance between the circular plate 96 and the end portion 36. Between each two adjacent first and second plates an axially extended third plate 74 is arranged. Three channel inlets 102 are formed at positions axially and radially aligned with the three inlets 92 on the outer sleeve 34. Each channel inlet 102 is defined between a second plate 72 and a third plate 74 adjacent to the second plate 72 at one side. The second and third plates are connected with each other to ensure the coolant entering from a respective inlet 92 on the outer sleeve 34 to flow into a respective channel. The third plate 74 adjacent to the second plate 72 at the other side integrally extends from the circular plate 96 and is spaced from the end portion 36. Each channel outlet 98 is formed on the circular plate 96 between the third plate 74 extending from the circular plate 96 and the first plate 70 adjacent to the third plate 74. Other third plates 74 except the third plates 74 defining the channel outlets 98 are spaced from the circular plate 96 and the end portion 36 and axially extend beyond free ends of adjacent first and second plates at two ends. Each two adjacent such third plates 74 are connected by a fourth plate 76 extending in the circumferential direction.

Thus, the flow guiding structure within the peripheral space 50 defines three continuous winding cooling channels between the circular plate 96 and the end portion 36 and a single circular outflow channel 100 between the circular plate 96 and the end portion 38 which connects the three winding cooling channels with the single outlet 94. The channel inlet 102 and the channel outlet 98 of each cooling channel are spaced from each other by nearly 240 degrees in the circumferential direction. Each winding cooling channel travels longitudinally back and forth on a respective two thirds circumferential part of the outer surface of the inner sleeve 32.

In the above described embodiments, the stator can be evenly cooled in the circumferential direction, the pressure loss is low, and the motor is shorter in the axial direction.

In the description and claims of the present application, each of the verbs "comprise", "include", "contain" and "have", and variations thereof, are used in an inclusive sense, to specify the presence of the stated item but not to exclude the presence of additional items.

Although the invention is described with reference to one or more preferred embodiments, it should be appreciated by those skilled in the art that various modifications are possible. Therefore, the scope of the invention is to be determined by reference to the claims that follow.

For example, while the flow guiding structure has been shown and described as guiding plates, it may be formed as pipes in which the coolant flows.

The invention claimed is:

1. A cooling device, comprising:
    an inner sleeve with an outer surface, defining circumferential and longitudinal directions;
    an outer sleeve surrounding the inner sleeve;
    two end portions extending between the inner sleeve and the outer sleeve at both ends thereof, the inner sleeve, the outer sleeve and the end portions defining a peripheral space;
    a flow guiding structure which defines N cooling channels in the peripheral space allowing coolant to flow, each channel having at least two branches; and
    N pairs of inlet and outlet corresponding to the N cooling channels, the branches of each cooling channel being in fluid communication with the respective pair of inlet and outlet, each branch extending over a half circumferential part of the outer surface of the inner sleeve;
    wherein N is greater than 1 and the N cooling channels are not in communication with each other.

2. The cooling device of claim 1, wherein each branch of the cooling channels extends longitudinally along a path which goes back and forth in the circumferential direction.

3. The cooling device of claim 1, wherein the branches of the N cooling channels are alternately arranged in the circumferential direction.

4. The cooling device of claim 1, wherein the inlet of each pair is close to the outlet of another pair.

5. An electric motor comprising a stator, a rotor installed in the stator, and the cooling device of claim 1, wherein the cooling device is fixed to an outer surface of the stator.

6. The electric motor of claim 5, wherein the cooling device is a press fit on a core of the stator.

7. A cooling device comprising:
- an inner sleeve with an outer surface, defining circumferential and longitudinal directions;
- an outer sleeve surrounding the inner sleeve;
- two end portions arranged at both ends thereof, the inner sleeve, the outer sleeve and the end portions defining a peripheral space;
- a flow guiding structure which defines N winding cooling channels in the peripheral space allowing coolant to flow; and
- N inlets and a single outlet, the coolant entering into the N winding cooling channels respectively from the N inlets and flowing out from the single outlet, where N is an integer greater than 1.

8. The cooling device of claim 7, wherein the cooling device further comprises a circumferentially extended outflow channel connecting the N winding cooling channels and the single outlet.

9. The cooling device of claim 7, wherein each of the N winding cooling channels extend longitudinally along a path which goes back and forth in the circumferential direction.

10. The cooling device of claim 9, wherein N is equal to or greater than 3, every two cooling channels are alternately arranged in the circumferential direction, and each cooling channel extends over a respective circumferential part of the outer surface of the inner sleeve within a range of 720/N degrees.

11. The cooling device of claim 7, wherein the N inlets are spaced in turn by 360/N degrees in the circumferential direction.

12. An electric motor comprising a stator, a rotor installed in the stator, and the cooling device of claim 7, wherein the cooling device is fixed to an outer surface of the stator.

13. The electric motor of claim 12, wherein the cooling device is a press fit on a core of the stator.

* * * * *